United States Patent [19]

Chopra et al.

[11] Patent Number: 6,167,423
[45] Date of Patent: *Dec. 26, 2000

[54] CONCURRENCY CONTROL OF STATE MACHINES IN A COMPUTER SYSTEM USING CLIQUES

[75] Inventors: Gagan Chopra, Redmond; Matthew Clark McCline, Bellevue; Patrick James Helland, Redmond; Mohsen M. Al-Ghosein, Issaquah, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/825,647

[22] Filed: Apr. 3, 1997

[51] Int. Cl.⁷ ........................................................ G06F 9/00
[52] U.S. Cl. ............................................ 709/100; 709/102
[58] Field of Search ................................... 709/100, 102, 709/104, 107; 710/200, 54

[56] References Cited

U.S. PATENT DOCUMENTS

| | | | |
|---|---|---|---|
| 4,807,111 | 2/1989 | Ogle et al. ............................... | 710/54 |
| 5,016,166 | 5/1991 | Van Loo et al. . | |
| 5,179,702 | 1/1993 | Spix et al. . | |
| 5,247,675 | 9/1993 | Farrell et al. . | |
| 5,313,638 | 5/1994 | Ogle et al. ............................... | 710/200 |
| 5,339,415 | 8/1994 | Strout II et al. . | |
| 5,421,013 | 5/1995 | Smith . | |
| 5,434,975 | 7/1995 | Allen . | |
| 5,463,625 | 10/1995 | Yasrebi . | |
| 5,493,728 | 2/1996 | Solton et al. . | |
| 5,504,898 | 4/1996 | Klein . | |
| 5,519,867 | 5/1996 | Moeller et al. . | |
| 5,555,368 | 9/1996 | Orton et al. . | |
| 5,555,388 | 9/1996 | Shaughnessy . | |
| 5,560,029 | 9/1996 | Papadopulous et al. . | |
| 5,574,862 | 11/1996 | Marianetti, II . | |
| 5,598,562 | 1/1997 | Cutler et al. . | |
| 5,603,063 | 2/1997 | Au . | |
| 5,630,136 | 5/1997 | Davidson et al. ........................ | 709/106 |
| 5,675,796 | 10/1997 | Hodges et al. . | |
| 5,742,822 | 4/1998 | Motomura ............................... | 709/102 |
| 5,787,281 | 7/1998 | Schreiber et al. . | |

OTHER PUBLICATIONS

F.J. Burkowski, G.V. Cormack, G.D.P. Dueck, "Architectural Support for Synchronous Task. Communication" SIGARCH Computer Architecture News, vol. 17, No. 2, Apr. 1989, PP 40–53.

Brian N. Bershad, Thomas E. Anderson, "User–Level Interprocess Communication for Shared Memory Multi–processors" ACM Transaction on Computer Systems, vol. 9, No. 2, May 1991, pp. 175–198.

(List continued on next page.)

*Primary Examiner*—Majid A. Banankhah
*Attorney, Agent, or Firm*—Klarquist Sparkman Campbell Leigh & Whinston, LLP

[57] ABSTRACT

In a computing environment containing a plurality of state machines that communicate by passing messages on connections, a construct called a clique controls access into a set of the state machines by worker threads that deliver the messages arriving on the connections. A clique is a collection of connections into the set of the state machines that have a common relationship for which concurrency isolation is required. Each clique has a message queue and a guard for marking the clique as busy or not busy, The guard prevents more than one thread at a time from delivering messages that arrive on connections in the clique to the set of state machines, thus ensuring concurrency isolation of the set of state machines. Messages that arrive on a connection in the clique while the clique is marked as busy are queued in the clique's message queue. The queued messages are delivered one at a time by a same worker thread that is currently busy in the clique. This operation can save a thread switch when a state machine generates an outgoing message that results in an immediate incoming message to the state machine, such as a buffer full message, and thus makes efficient use of the worker threads.

18 Claims, 9 Drawing Sheets

OTHER PUBLICATIONS

Tucker (Editor), *The Computer Science and Engineering Handbook,* pp. 1058–1077 and 1725–1746 (1996).

King, A., "Inside Windows® 95, " Microsoft Press, pp. 296–303 (1994).

Black, D.L., "Scheduling Support for Concurrency and Parallelism in the Mach Operating System," Computer, pp. 35–43 (May 1990).

King, A., "Inside Windows® 95, " Microsoft Press, pp.103–150 (1994).

Abadi et al., "A Calculus for access Control in Distributed Systems, " pp. iii–viii and 1–44 (Feb. 1991).

Abadi, "Baby Modula–3 and a Theory of Objects," SRC Research Report, pp. iii–iv and 1–36 (Feb. 1993).

Birrell et al., "Synchronization Primitives for a Multiprocessor: A Formal Specification," SRC Research Report, pp. i–iii and 1–20 (Aug. 1987).

Birrell, "An Introduction to Programming with Threads," SRC Search Report, pp. 1–33 (Jan. 1989).

Broy et al., "Can Fair Choice be Added toDijkstra's Calculus," SRC Research Report, pp.1–17 (Feb. 1989).

Burstall et al., "A Kernal Language for Modules and Abstract Data Types," SRC Research Report, pp. 2–51(Sep. 1984).

Cardelli, "A Polymorphic lambda–calculus with Type: Type," SRC Research Report, pp. 1–27 (May 1986).

Cardelli et al., "Modula–3 Report (revised)," SRC Research Report, pp. 1–71 (Nov. 1989).

DeTreville, "Experience with Concurrent Garbage Collectors for Modula–2+." SRC Research Report, pp. 1–54 (Nov. 1990).

Ellis et al., "Real–time Concurrent Collection on Stock Multiprocessor," SRC Research Report, pp. 1–24 (Feb. 1988).

Horning et al., "Some Useful Modula–3 Interfaces," SRC Research Report, pp. iii–vii and 1–103 (Dec. 1993).

Lamport, "A Fast Mutual Exclusion Algorithm," SRC Research Report, pp. iii and 1–12, (Nov. 1985).

Lamport, "A Simple Approach to Specifying Concurrent Systems," SRC Research Report, pp.iii–viii and 1–39 (Dec. 1986).

Lamport, "Conurrent Reading and Writing of Clocks," SRC Research Report, pp. iii–vii and 1–7 (Apr. 1988).

Lamport, "How to Make a Correct Mulitprocess Program Execute Correctly on a Multiprocessor," SRC Research Report, pp. iii–vii and 1–10 (Feb. 1993).

Lamport, "On Interprocess Communication," SRC Research Report, pp. iii–viii and 1–50 (Dec. 1985).

Lamport, "win and sin: Predicate Transformers for Currency," SRC Research Report, pp. iii–ix and 1–43 (May 1987).

McJones et al. "Evolving the UNIX System Interface to Support Multithreaded Programs, " SRC Research Report, pp. 1–80 (Sep.1987).

Nelson, "A Generalization of Dijkstra's Calculus," SRC Research Report, pp. 1–56 (Apr. 1987).

Owicki, "Experience with the Firefly Multiprocessor Workstation," SRC Research Report, pp. 1–17 (Sep. 1989).

Roberts et al., "WorkCrews: An Abstraction for Controllong Parallelism," SRC Research Report, pp. 1–17 (Apr. 1989).

Rovner et al., "On Extending Modula–2 for Building Large, Integrated Systems," SRC Research Report, pp. 1–45 (Jan. 1985).

Schroeder et al., "Performance of Firefly RPC," pp. 1–15 (Apr. 1989).

Thacker et al., "Firefly: AMultiprocessor Workstation," SRC Research Report, pp. 1–17 (Dec. 1987).

CONCURRENCY CONTROL OF STATE MACHINES IN A COMPUTER SYSTEM USING CLIQUES

FIELD OF THE INVENTION

The present invention relates to concurrency isolation and thread management in computer software.

BACKGROUND AND SUMMARY OF THE INVENTION

In complex software environments, it is often helpful to program software for a particular task or application as a plurality of software state machines that interact by passing messages so as to simplify programming of the application. A state machine is a software component that maintains data defining its state between messages from other state machines, and whose behavior at any given time in response to incoming messages from other state machines depends on its state. An example of a data processing application that may be programmed as message-passing state machines is a transaction processing system, such as an order processing system for an on-line bookstore. The state machines in this example may implement individual transactions (e.g., a single customer's book order) or parts of a transaction (e.g., updating inventory, scheduling shipment, processing a credit card payment, etc.). The individual state machines that implement small parts of the overall order processing task in the system simplify programming the overall application in that the programmer simply defines the various states that the individual state machines can assume, and the behavior of the state machines in response to input messages in those states.

In large volume data processing systems, a large number of state machines may need to be active at any time in order to handle processing demand. For example, the on-line bookstore application may need to process tens, hundreds or more orders from customers at a time. Where parts of the processing task for each order are implemented in different state machines, each of the orders may require multiple state machines operating concurrently. To handle this processing demand, the state machines are executed in a multi-tasking or multi-threaded operating environment. Because implementing each of hundreds of active state machines in such a system as a separate process having its own thread or threads of execution would be prohibitively expensive in terms of computing resources (i.e., memory, processor time, etc.), the state machines preferably execute in an operating environment that provides a set of worker threads that are not exclusively assigned to any one state machine, but rather are scheduled to execute in the state machines as needed.

The terms "process" and "thread" both refer to an execution context or sequential stream of instruction execution. A process refers to an execution context associated with an entire program that is allocated resources such as memory, processor time, and files. A thread, also called a lightweight process, refers to an execution context that is independently scheduled, but shares a single address space with other threads. (See, Tucker Jr., Allen B. (editor), *The Computer Science and Engineering Handbook*, pp. 1662–1665, CRC Press 1997.)

Multi-threaded operating environments provide necessary concurrency for meeting large volume data processing demands, but also can lead to well-known synchronization problems. Particularly, multiple threads that access a common shared memory region can interfere with each other and cause data corruption. This data corruption or loss may be due to the thread scheduler pre-empting execution of a first thread while the first thread is modifying a data structure or otherwise executing code in a shared region of memory, and then scheduling execution of another thread that also modifies the data structure or executes the code while the first thread is pre-empted. For example, when two threads each try to add an element to a doubly linked list at the same time, one or the other element may be lost, or the list could be left in an inconsistent state.

Another synchronization problem arises in circumstances where code executed by a first thread utilizes a result produced in code executed by a second thread. In this circumstance, the first thread is said to have a data dependency on the second thread. For correctness, the first thread must halt execution and wait until the result is available (also known as "blocking").

There are several well-known mechanisms to synchronize multiple threads so as to ensure that only a single thread executes in a particular block of code or accesses a data structure at one time One such mechanism is known as a "lock." A lock is associated with a particular block of code (called a "critical section") that only one thread at a time is allowed to execute. Before a thread can execute the critical section, the thread must first acquire the lock. If the lock already is held by another thread, the thread requesting the lock blocks until the lock is released. A programmer can restrict access by threads to a data structure by placing any code that operates on the data structure within a critical section The lock thus serves to serialize access by threads to a block of code or data structures. In other words, the lock isolates code or data structures from concurrency (i.e., provides concurrency isolation).

Another synchronization mechanism, known as the "condition variable," is used for resolving data dependencies between threads. The condition variable is a mechanism by which a thread blocks until an arbitrary condition has been satisfied Another thread that makes the condition true is responsible for unblocking the waiting thread. Two special forms of condition variable are a "barrier" and a "join." A "barrier" is a form of condition variable which operates to synchronize a set of threads at a specific point in the program. The arbitrary condition of the barrier therefore is whether all threads have reached the barrier. When the final thread reaches the barrier, it satisfies the condition and unblocks all the waiting threads (known as "raising" the barrier).

In a join, a first thread spawns (i.e., creates another thread) to execute a procedure and proceeds with other processing work in parallel. Later, when the result of the procedure is needed, the first thread blocks until the spawned thread completes the procedure, returns its result, and unblocks the first thread. The condition for a join therefore is whether a given thread has finished.

A problem with these existing concurrency isolation mechanisms is that they generally require explicit programming in application program code. In the case of locks for example, the programmer must write instructions into the application program's code to acquire a lock before entering a specific critical section, and to release the lock when execution in the critical section is complete. This greatly complicates the programming task.

The present invention provides a form of concurrency isolation and thread management in a programming environment having a plurality of state machines communicating via messages sent on connections. In an illustrated embodiment of the invention, each connection is a communications path that preferably provides full-duplex, exactly-once, in-order delivery of messages between exactly two state machines. Each state machine communicates using one or more connections to other state machines.

In accordance with the invention. connections to a state machine or set of state machines with private data in shared memory or other need for concurrency isolation are grouped into collections that are herein termed "cliques." A clique is defined as a collection of connections that deliver a single message at a time in a serialized fashion. A system or method (e.g., a connection manager in the illustrated embodiment) that manages message delivery to the cliques ensures serialized delivery of messages to each clique. As further discussed below, the connection manager also ensures that only a single thread at a time execute in the state machines within a clique.

With each connection to a state machine grouped into one clique, the connection manager effectively provides concurrency isolation by ensuring that a state machine (or group of state machines) within its "sphere of control" never receives an incoming message on any of its connections while processing a previous message and that only one thread executes in the state machine or group at a time By enforcing these restrictions, the programmer need not implement locks and critical sections, or other form of concurrency isolation when programming individual state machines. More specifically, the state machines can be programmed as purely sequential code blocks that simply awaken, accept an incoming message, process the message, generate zero or more outgoing messages on any of its connections, and return to dormancy. The programmer need not be concerned about the state machine dealing with more than one message at a time or having more than one thread executing in the state machine at a time. In other words, the state machine is freed from the responsibility of locking access to its private code and data According to another aspect of the invention, the cliques and connection manager also promote efficient use of system threads in executing the state machines. In the connection manager of the illustrated embodiment, a thread that delivers an incoming message on a connection must first check whether the clique that contains the connection is busy. If not busy, the clique is marked as busy, and delivery and processing of the message in the state machine proceeds using the thread. On the other hand, if the clique already is busy, the thread instead places the message on a queue for later delivery to the clique and continues with other processing (e.g., attempting delivery of another message). After any thread completes processing a message in a state machine, the thread checks whether any messages have been queued for delivery to that clique by other threads, and also delivers and processes each of the queued messages in turn. When the thread completes processing a message in a state machine of the clique and no further messages have been queued by other threads for delivery to the same clique, the thread is free to move on to other work. In this way, the connection manager ensures that only a single thread executes in any state machine whose connections are grouped in a clique at a time.

The use of one thread to deliver and process all messages that are pending for a state machine or group of state machines with shared memory also reduces thread contention or blocking, and saves a thread switch. In particular, when a state machine generates an outgoing message during processing of an incoming message by a thread, the outgoing message may result in an immediate second incoming message to the state machine, such as a "buffer filled" message. The second incoming message becomes queued while the thread completes processing of the first incoming message. Upon completing processing the first incoming message, the same thread picks up and delivers the queued, second incoming message. In the absence of cliques, the thread that generates an outgoing message would not be used to deliver more incoming messages, such as the "buffer filled" message, because a dead lock condition may result. To avoid a possible deadlock without use of cliques, the additional incoming messages would have to be delivered using another thread. Cliques thus also help to minimize thread processing overhead.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

The present invention is directed toward a method and system for concurrency isolation and thread management using cliques. In one embodiment illustrated herein, the invention is incorporated into a database management system, entitled "Microsoft SQL Server 6.5," marketed by Microsoft Corporation of Redmond, Wash. Briefly described, this software is a scaleable, high-performance database management system for distributed client/server computing that provides a platform or environment for data processing applications. More specifically, the invention is incorporated into a component of the Microsoft SQL Server 6.5, entitled the "Distributed Transaction Coordinator" or "DTC," which provides support for transaction processing using a two phase commit protocol on distributed computing systems.

Exemplary Operating Environment

Figure 1:
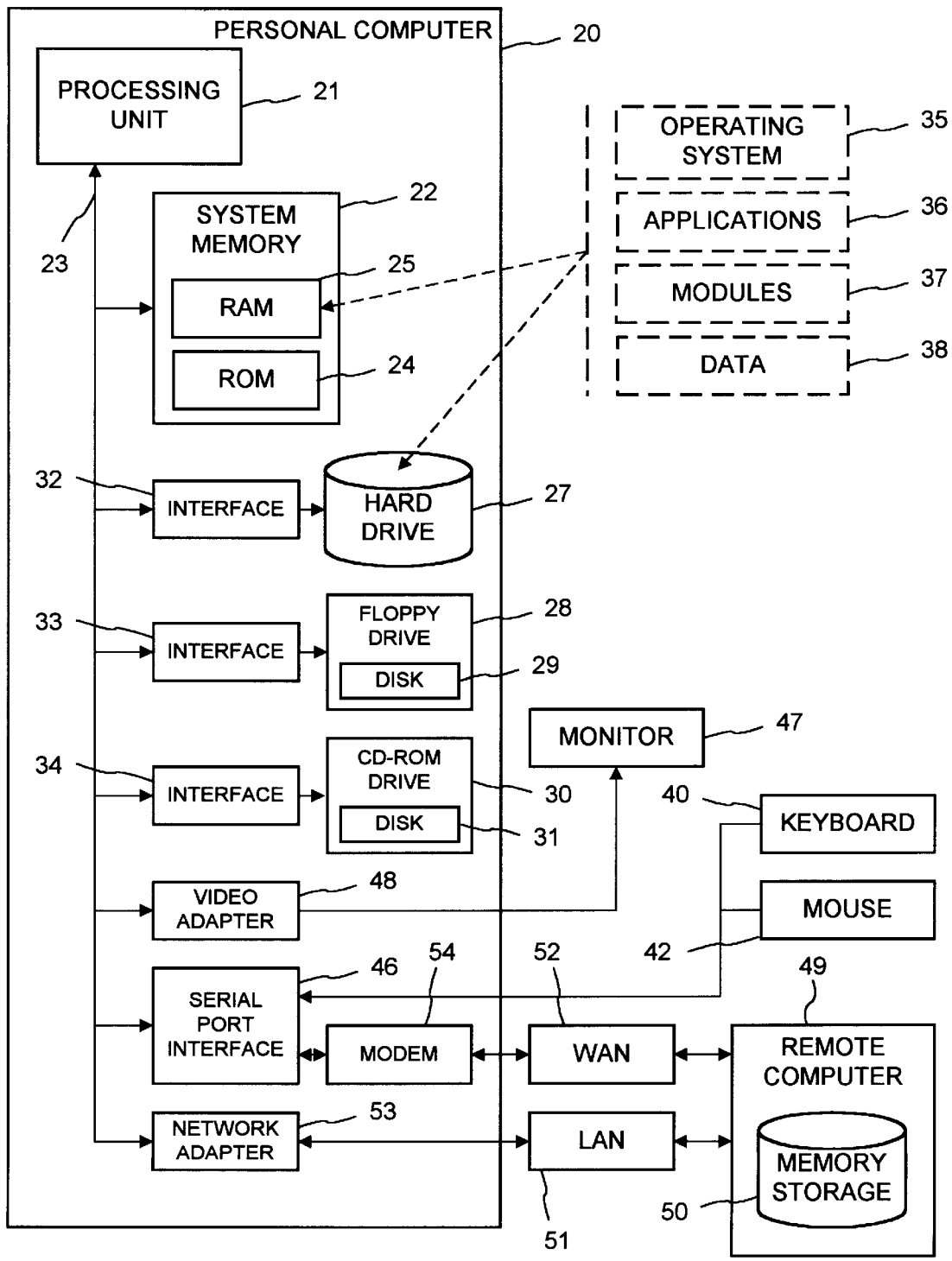
FIG. 1 is a block diagram of a computer system that may be used to implement a method and apparatus embodying the invention for providing concurrency isolation and thread management of state machines.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few, The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20 Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 5i through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Connection Manager Architecture

Figure 2:
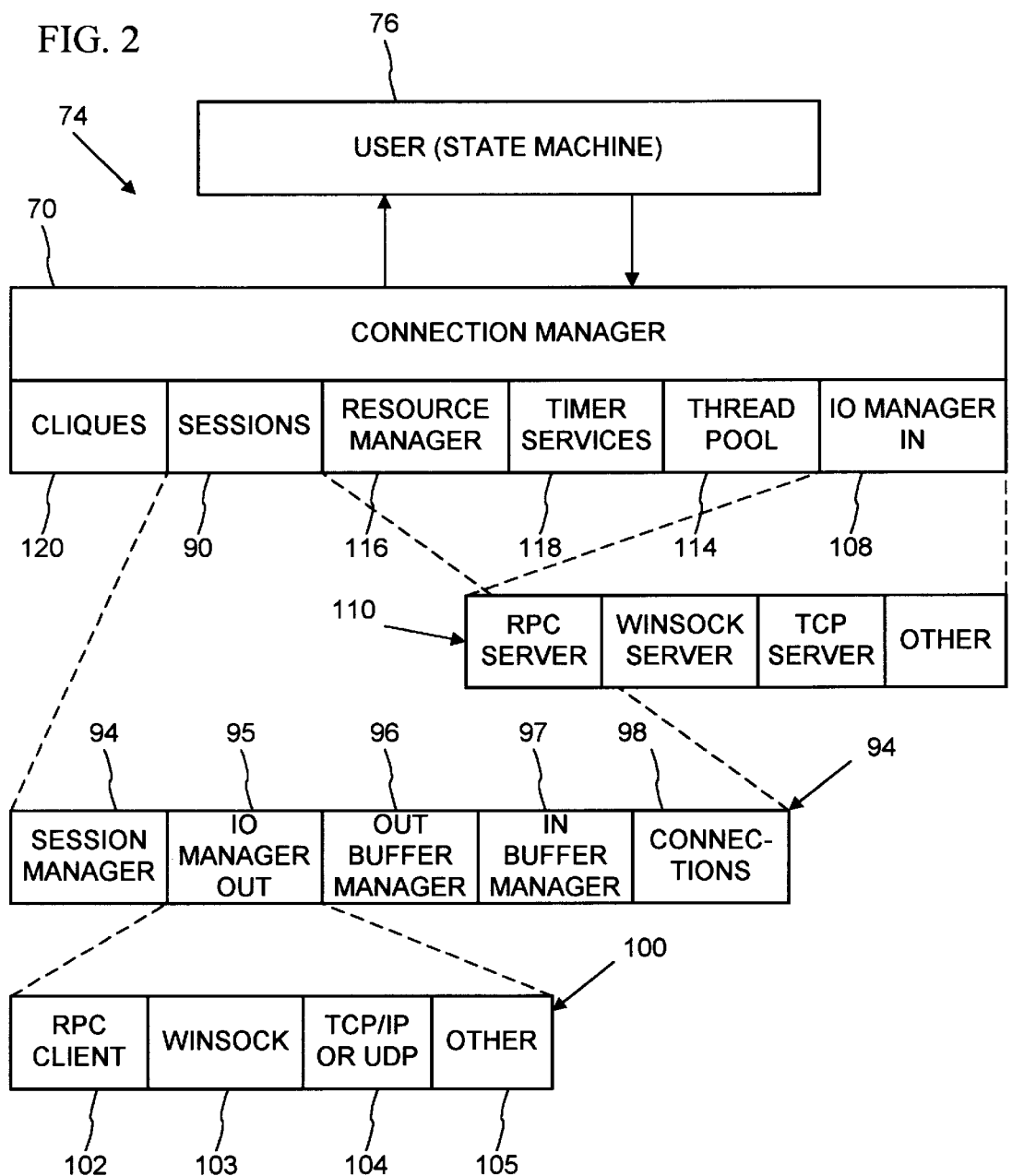
FIG. 2 is a block diagram of a software architecture for a connection manager that provides message passing services for state machines and implements cliques according to the illustrated embodiment of the invention.

With reference now to FIG. 2, the illustrated embodiment of the invention provides concurrency isolation and thread management for state machines in a complex data processing environment consisting of many individual state machines that communicate with one another using messages. The state machines are software components that maintain information defining their states. The state machines operate in response to incoming messages from other state machines according to their state information, to perform state transitions through a programming-defined sequence of states and to generate outgoing messages to other state machines. The state machines in the illustrated embodiment are threadless in that they do not possess an individual thread or threads for exclusive execution in their code.

The illustrated embodiment of the invention includes a connection manager 70 that provides services for message passing and threading to its users, the state machines. The connection manager 70 has a multi-layer architecture 74. Each layer is one or more program modules, and connects to layers above and below through programming interfaces (described in more detail below). The state machines that use the connection manager 70 are at a top layer of the architecture 74, called the user layer 76. The connection manager 70 provides its message passing and threading services to state machines in the user layer 76 through external interfaces, called the IConnectionManager, IConnectionManagerConfig, IConnectionDispenser, and ICliqueDispenser in the illustrated embodiment.

The connection manager 70 provides message passing services in the form of one-to-one connections between state machines. The connections perform full-duplex, exactly-once, in-order delivery of messages between exactly two state machines. Each state machine may have connections to one or more other state machines, and also multiple connections between a pair of state machines.

Messages in the illustrated connection manager are bit streams of data consisting of three attributes, variable length data, the size of the variable length data, and a message tag which describes the variable length data. The message tags are of two types, connection manager message tags and user message tags. Each message tag is an unsigned four byte value. Connection manager message tags have values in the range 0x0 through 0xFFF, while user message tags have values larger than 0xFFF.

A connection between any two connection manager users or state machines in the user layer 76 consumes significant processing time to set up, yet two state machines can have multiple connections simultaneously created and terminated. For performance, the connection manager 70 therefore creates a common underlying, bi-directional message channel or pipe, called a session, at the time a first connection is requested between two state machines. Once a session is established between two state machines, all other connections between the state machines are multi-plexed on that session.

Figure 3:
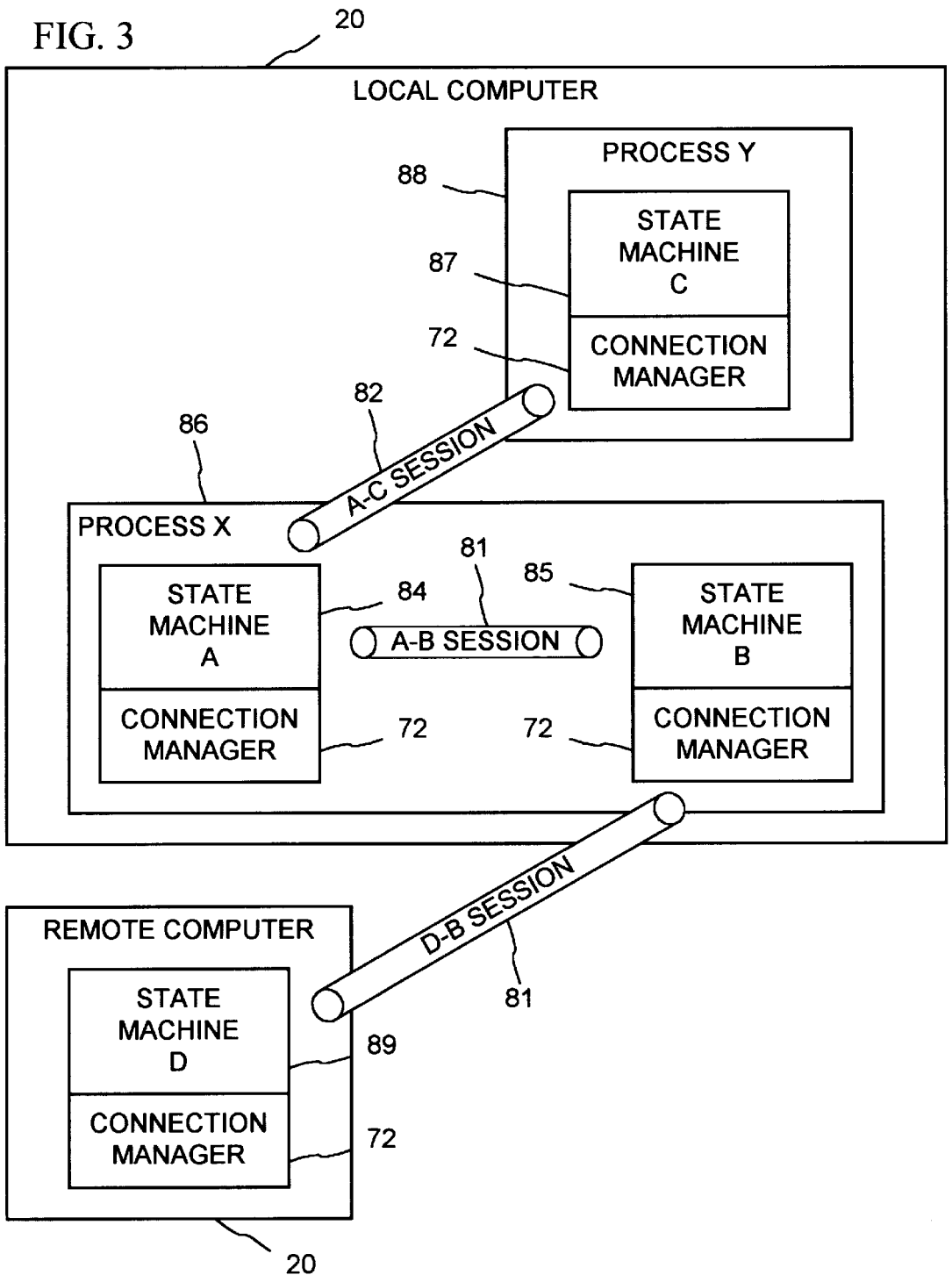
FIG. 3 is a block diagram illustrating examples of various connections supported by the connection manager of FIG. 2 between state machines at different locations, including in-process, out-of-process, and remote.

FIG. 3 illustrates that the connection manager 70 provides messaging services to the state machines that are location transparent. The state machines can establish connections with other state machines through a single interface to the connection manager regardless of the locations of the other state machines. In an illustrative example 80 of FIG. 3, the connection manager 70 provides sessions 81–83 for connections between states machines A 84 and B 85 that are both in a same process X 86 (also referred to as being "in process") on the local computer 20, as well as between state machines A 84 and C 87 that are in different processes X 86 and Y 88 or between state machines B 85 and D 89 that reside on different host computers 20 and 50. The connection manager uses an appropriate underlying transport mechanism as the data channel for conveying messages in each session (e.g., shared memory, named pipes or local procedure calls for sessions between state machines on a same host computer; and remote procedure calls or a networking protocol for sessions between state machine residing on different computers).

In the architecture 74 shown in FIG. 2, the connection manager 70 includes a sessions module 90 which manages the sessions for the connection manager's users. More specifically, the sessions module 90 manages modules at a session layer 92 of the architecture that implement sessions between the state machines. Each session has a number of program modules at the session layer 92 that include a session manager module 94, an I/O manager out module 95, an out buffer manager module 96, an in buffer manager module 97, and a connections module 98. The session manager module 94 controls the session and maintains its state information. The I/O manager out module 95 provides a generic client side interface for the I/O manager by which all outbound messages are sent. The out buffer manager module 96 manages buffers in which out-bound messages are held Conversely, the in buffer manager module 97 manages buffers in which in-bound messages are received including sorting a group of messages that are buffered together, and passing them to their destination connections. The connections module 98 maintains the set of connections that are open on the particular session between two state machines.

The client interface provided by the I/O manager out module 95 allows access to various underlying network protocols that convey messages between computers in a distributed computer network for connections between state machines that reside on remote computers. A set of modules at a network protocols interface out layer 100 are implementation dependent versions of the interface specific to particular underlying network protocols used to convey the messages between computers in a distributed computer network The illustrated architecture include modules 102–105 which implement the connection manager I/O manager out interface for a remote procedure call (RPC) client, a winsock network programming interface, and a TCP/IP or UDP network protocol, which are all well known networking protocols.

The connection manager 70 also includes an I/O manager in module 108 that provides a generic interface to control incoming message traffic (e.g., to start or stop accepting messages) from the underlying network protocols. Network protocol implementation dependent versions of the interface are provided in a lower network protocol interface in layer 110.

The connection manager 70 also manages a set of worker threads that are maintained in a thread pool 114. The worker threads, when in the thread pool 114, have no state or context associated with them. The connection manager 70 takes worker threads from the thread pool to perform processing of sent and received messages, as well as responding to service requests from the state machines within the connection manager's modules. The connection manager 70 also uses the worker threads for delivering messages into the state machines and processing of messages in the state machines (i.e., executing code in the state machines at the user layer 76). When any worker thread completes its processing work (e.g., delivering and processing messages in a state machine), the connection manager returns the worker thread to the thread pool 114.

The connection manager 70 also includes a resource manager module 116, a timer services module 118, and a cliques module 120. The resource manager module 116 manages all free resources belonging to the connection manager, including connection modules, memory pages, session modules, cliques, etc. The timer services module 118 provides timing services for the connection manager 70. In particular, the timer services module 118 produces a timer tick at uniform time intervals to the session modules 94 so that the modules can perform time based servicing of the session, such as pinging to determine whether the other party to the session is still in operation. The cliques module 120 manages the cliques that are described below.

Connection Objects and Interfaces

Figure 4:
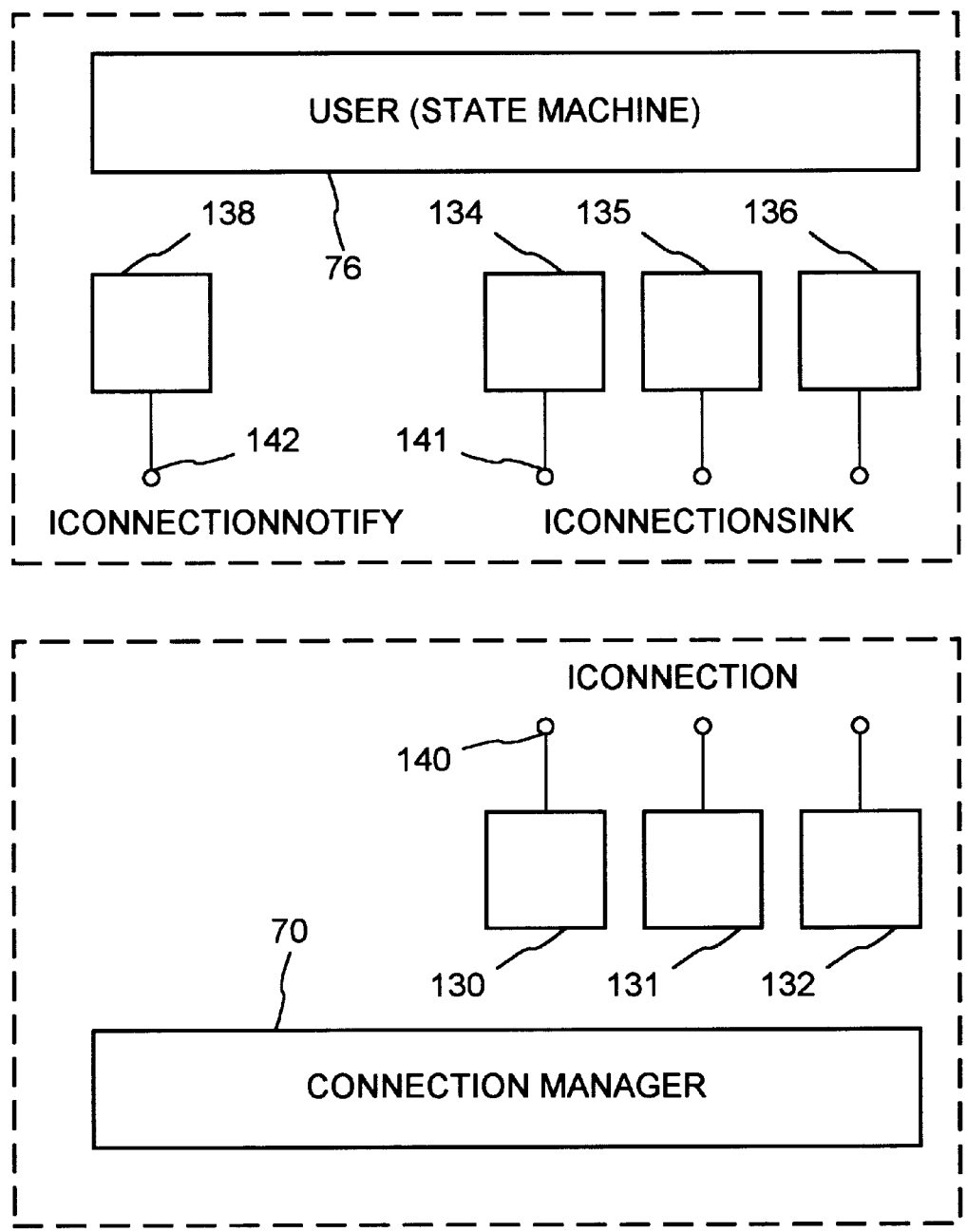
FIG. 4 is a block diagram of connection objects provided by the connection manager of FIG. 2 that implement connections to and from a state machine.

With reference now to FIG. 4, the connection manager 70 (FIG. 2) in the illustrated embodiment implements each connection to an individual state machine as a set of objects that support predefined interfaces. Objects are software components that may encapsulate both code (i.e., functions or procedures comprising a sequence of program instructions) and data, and expose their functionality (i.e., the code) to other programs and objects (referred to as "clients") through interfaces. An interface is a named set of logically related functions. Each object is an instance of an object type (referred to as a "class") which defines the structure of interfaces that its objects support. Preferably, these objects conform to well known object-oriented programming principles, including data encapsulation, polymorphism and inheritance. The objects may be implemented in accordance with well known object standards, such as Microsoft's Component Object Model ("COM").

The set of objects that implement connections to a state machine include instances of a connection object 130–132 (one per connection) provided by the connection manager 70, instances of a connection sink object 134–136 (one per connection) provided by the state machine 76, and a connection notify object 138 (per state machine) also provided by the state machine. The connection objects 130–132 each support an IConnection interface 140, while the state machine's connection sink objects 134–136 support an IConnectionSink interface 141 and connection notify object 138 supports an IConnectionNotify interface 142. (In the notation of Microsoft's COM, interfaces are denoted by names beginning in an initial capital 'I.')

The state machine 76 calls functions exposed through the IConnection interface 140 of one of the connection objects 130–132 to send outgoing messages on the respective connection implemented by the connection object. The state machine 76 also registers the IConnectionSink interface 141 of a connection sink object 134–136 for each connection, and registers the IConnectionNotify interface 142 of its connection notify object 138 with the connection manager. The connection manager 70 calls functions exposed through the IConnectionSink interface 141 of the connection sink objects 134–136 to deliver incoming messages on a connection into the state machine 76. The connection manager 70 calls functions exposed through the IConnectionNotify interface 142 to request that the state machine provide a connection sink object so as to establish a connection initiated by another state machine.

Cliques

The connection manager 70 (FIG. 2) also provides constructs, herein called "cliques," with which the connection manager externally manages concurrent execution of the worker threads within the state machines 76. A clique in the illustrated connection manager is a collection of connections to a state machine or group of state machines that require concurrency isolation. The connection manager ensures concurrency isolation of the state machine or group by allowing only one worker thread into the clique. More specifically, if a thread is delivering a first message on one of the connections in a clique, the connection manager does not allow any messages to be delivered on any connection in that clique until after delivery of the first message is complete.

Figure 5:
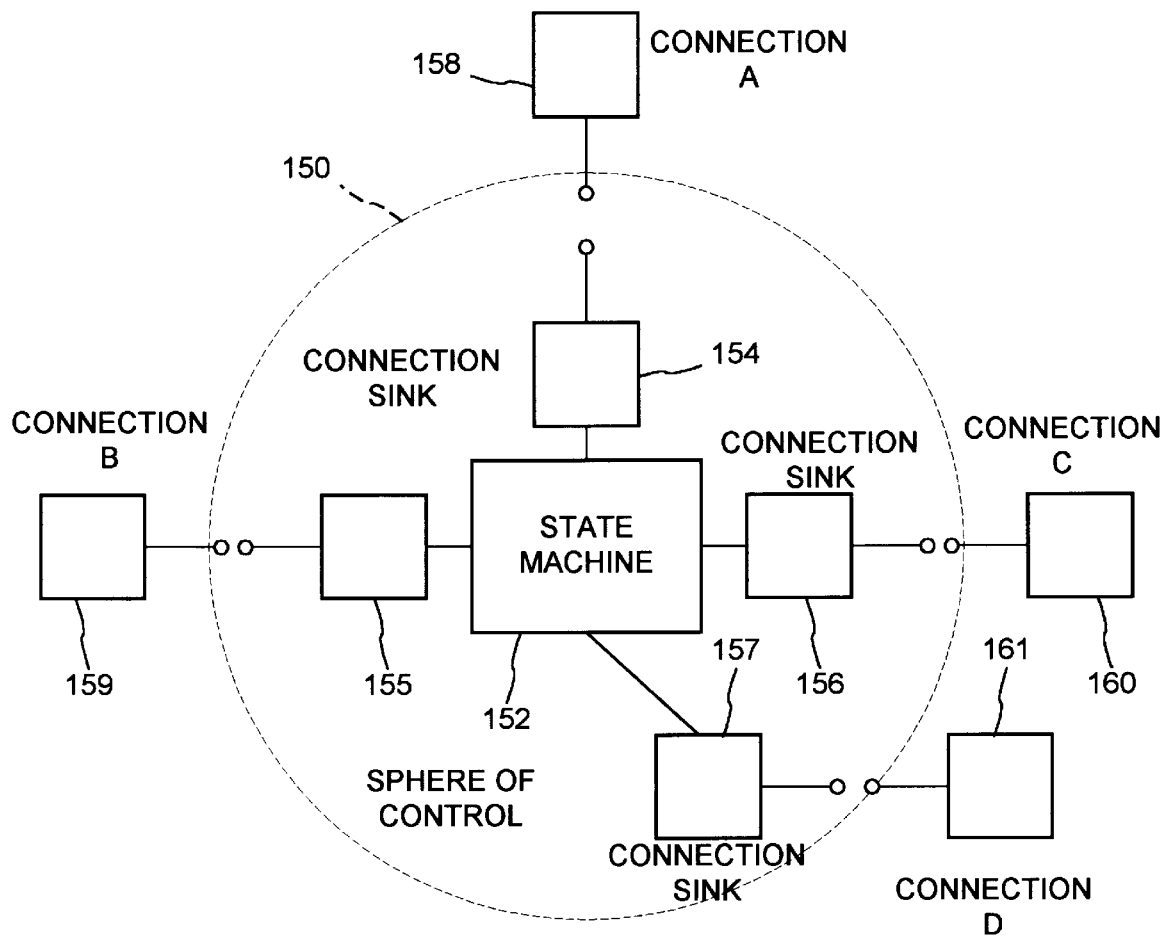
FIG. 5 is a block diagram illustrating a sphere of control of a clique provided by the connection manager of FIG. 2 in which the clique ensures concurrency isolation.

Conceptually then, as illustrated in FIG. 5, a clique creates a sphere of control 150 that encompasses a state machine 152 (together with its connection sink objects 154–157) all of whose connections 158–161 to other state machines outside the sphere of control are included in the clique. The connection manager 70 controls entry of worker threads into the sphere of control. The state machine itself is threadless, thus the only threads that execute within the sphere of control are those that the connection manager assigns to deliver a message on a connection within the clique. The connection manager does not allow another thread to deliver any message on any of the connections until any thread already delivering a message into the clique returns. Although multiple messages may arrive for the state machine at the same time on different connections from different other state machines, the connection manager only allows one message to be delivered by a worker thread into the sphere of control at a time. Any other messages are buffered in the connection manager and delivered serially when processing of a previous message in a state machine within the sphere of control completes This ensures that only one thread ever executes at a time within the sphere of control 150 of the clique, including inside the state machine 152 or any of its sink objects 154–157 that are encompassed within the sphere of control.

The sphere of control 150 of a clique may encompass a single state machine 152 as in the example illustrated in FIG. 4, or a group of state machines that have shared data structures or other common relationship that requires concurrency control. So as to provide concurrency isolation for the state machine 152, all connections to the state machine from outside the sphere of control of the clique must be included in the clique. The number of connections that the state machine or group encompassed within the sphere of control has to outside state machines can vary over time. The clique thus may persist longer than any single connection of the state machine or group protected by the clique, and can exist in the absence of any connection to outside state machines. Accordingly, the number of connections included in a clique can be greater than or equal to zero.

The connection manager 70 can have multiple cliques in operation at a time. Each clique provides a separate sphere of control in which concurrency is isolated to permit execution of only a single worker thread of the connection manager within that sphere of control. However, the connection manager does not provide concurrency isolation between cliques. In other words, the connection manager can have worker threads executing in different cliques at the same time, just not multiple threads in a same clique.

Figure 6:
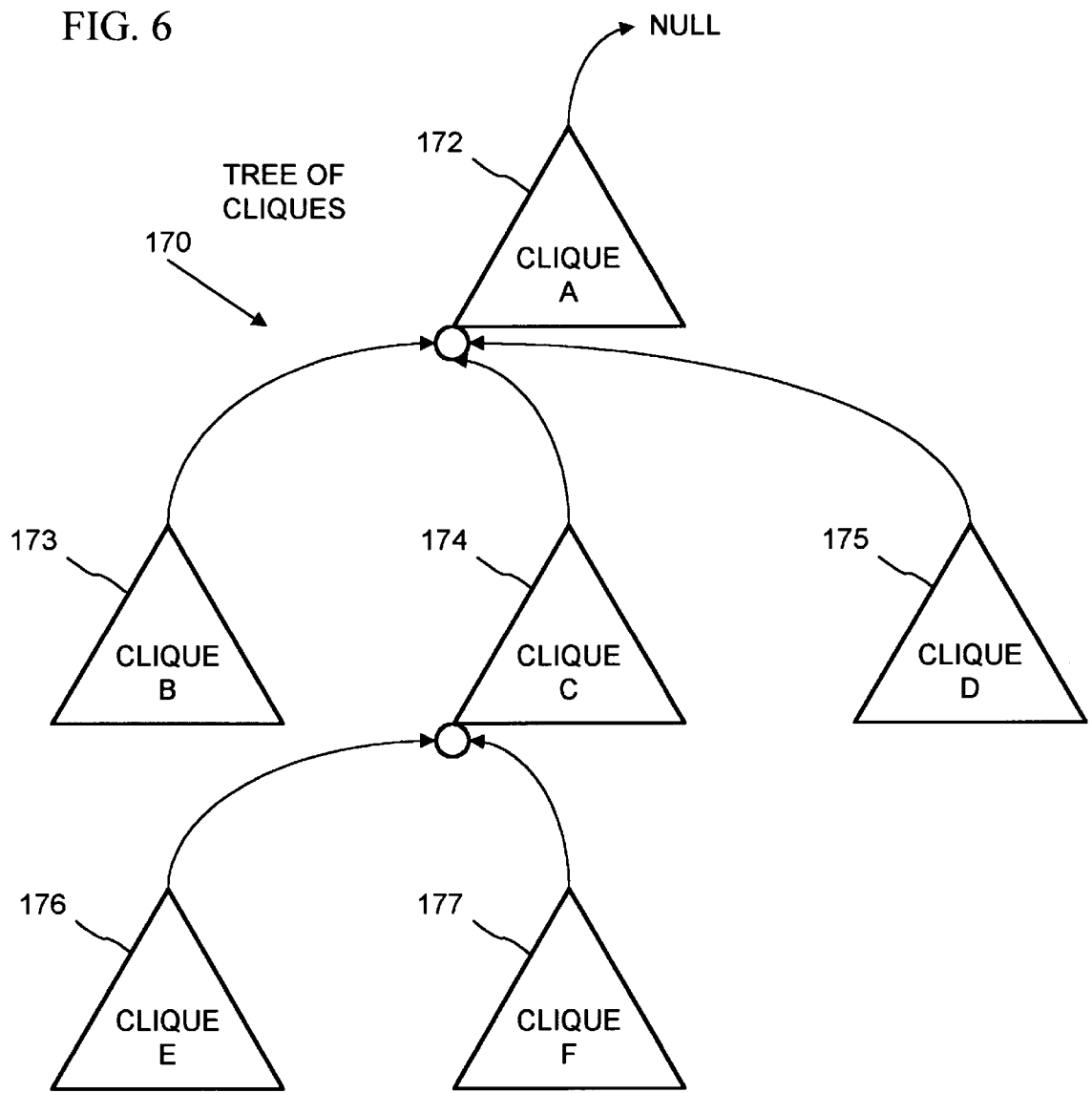
FIG. 6 is a block diagram illustrating a tree of cliques data structure used by the connection manager of FIG. 2 for joining and splitting operations on cliques.

Referring to FIG. 6, the group of state machines that have a shared data structure or other common relationship requiring concurrency isolation can change over time, which can lead to a need to change which state machines are encompassed within the sphere of control of a clique. The illustrated connection manager facilitates such changes by providing operations for cliques to join with or split from other cliques. When one clique is joined to another clique, a tree of cliques 170 is formed as illustrated in FIG. 6. A clique joins another clique as a child of the other clique in the tree 170. A clique can have at most one parent clique in the tree 170, i.e., it can join at most one other clique. The root of the tree cannot be joined to another clique so as to avoid cycles. All cliques 172–177 in the tree 170 are treated by the connection manager 70 (FIG. 2) as if a single clique. More specifically, the connection manager 70 controls delivery of messages by threads into all cliques such that only a single thread can execute within the collective spheres of control of the joined cliques at a time.

Thread Management

Figure 7:
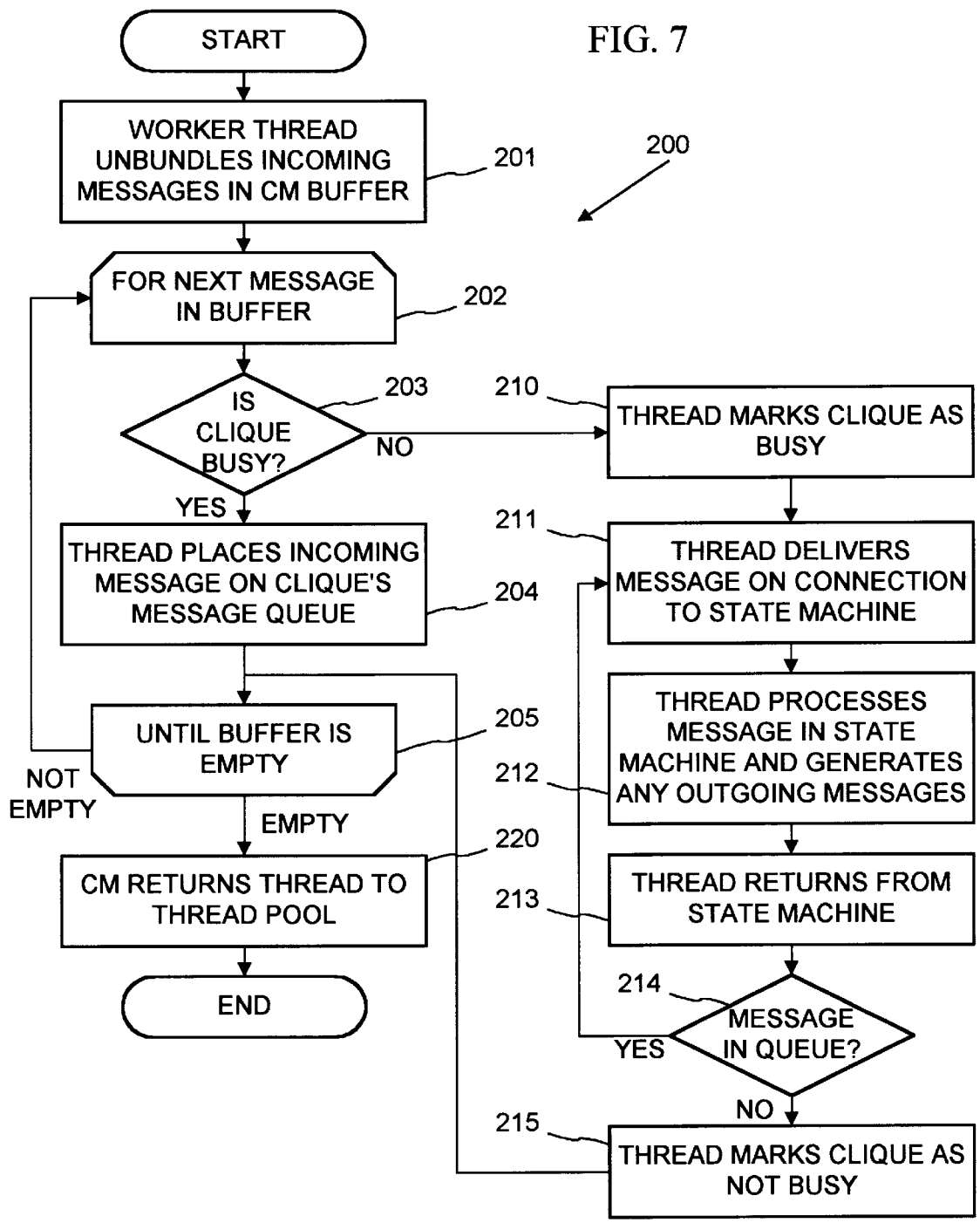
FIG. 7 is a flow chart of a method in the connection manager of FIG. 2 for efficiently managing delivery of messages and execution of state machines by a worker thread from the connection manager's thread pool.

With reference to FIG. 7, the connection manager 70 (FIG. 2) manages the delivery and processing of messages by worker threads from the thread pool 114 according to a method 200 so as to ensure concurrency isolation within each clique. In addition to providing concurrency isolation, the method 200 also efficiently utilizes the worker threads for message passing and processing in the state machines so as to minimize thread switching.

In the method 200, groups of incoming messages conveyed from counterpart connection managers residing on other host computers in a distributed network arrive as a bundle or chunk at the connection manager 70 (FIG. 2), and are placed in an "in buffer" managed by the connection manager 70 At step 201 of the method 200, the connection manager 70 takes an available worker thread from the thread pool 114 to begin unbundling the incoming messages held in the in buffer. The worker thread disassembles the bundled incoming messages, and extracts the messages in order from the in buffer as indicated at step 202.

As indicated at step 203, the worker thread commences to deliver the message taken from the in buffer by checking whether the clique that contains the connection on which the message is to be delivered is currently marked as busy. If the clique is busy, the worker thread at step 204 places the message in the message queue of that clique, and loops back at step 205 to extracting (step 202) the next message from the connection manager's in buffer. Delivery of the message that is left by the worker thread in the clique's message queue will be done by the worker thread that is currently busy executing in the clique as described below.

Otherwise, if the clique is not marked as busy at step 203, the worker thread marks the clique as busy at step 210, and proceeds to deliver the message on the appropriate connection in the clique to its destination state machine at step 211 As described above and illustrated in FIG. 4, the worker thread delivers the incoming message on the connection by calling into the connection sink object provided by the destination state machine for the connection. The worker thread is now executing code that is within the sphere of control 150 (FIG. 5) of the clique.

At step 212, the worker thread, on delivering the message to the state machine, also processes the message within the state machine. In processing the message, the worker thread may cause a state transition of the state machine and generate outgoing messages from the state machine onto any of the state machine's connections (e.g., connections 158–161 in the illustrative example shown in FIG. 5). When processing of the message is complete, the worker thread returns out of the state machine at step 213.

On returning from the state machine, the worker thread checks at step 214 whether any messages are queued for delivery at the clique. If so, the worker thread removes the message that is first in order (e.g., in a first-in, first-out ("FIFO") order) from the clique's message queue, and repeats the steps 211–213 for delivering and processing the message on a connection to a state machine in the clique's sphere of control (which may be the same or a different state machine than the previously delivered message if there are multiple state machines within the clique's sphere of control). Otherwise, if there are no messages waiting in the message queue of the clique (i.e., either because no other worker threads placed messages in the queue while the worker thread was busy in the clique or because the worker thread has delivered all messages that were queued by other threads while the worker thread was busy in the clique), then the worker thread marks the clique as not busy at step 215 and returns to step 205 in the loop 202–205 for unbundling of messages in the connection manager's in buffer.

If there are no additional messages in the connection manager's in buffer at step 205 (e.g., upon completion of delivering messages in a clique or queueing a message at a busy clique by the worker thread), the connection manager returns the worker thread to the thread pool at step 220. The worker thread then remains available in the thread pool 114 for a subsequent iteration of the method 200 when additional incoming messages arrive in the connection manager's in buffer (e.g., from another connection manager at another host computer).

By managing the use of the worker threads for executing in the state machines according to the method 200, the connection manager 70 (FIG. 2) provides dynamic and efficient assignment of threads for executing in the state machines. In particular, the method 200 continues to use a worker thread that is processing a first message in a state machine to also deliver any new messages that have arrived for the state machine during processing of the first message. For example, a thread which generates outgoing messages while processing the first message in the state machine may continue to deliver and process messages that arrive for the state machine from other state machines in response to those outgoing messages.

This technique, which is only possible due to the operation of cliques, is more efficient since it saves a thread switch. By contrast, in the absence of cliques, the thread that generates the outgoing messages would not be used to deliver resulting incoming messages (such as a "buffer filled" message) because a deadlock may result. Instead, all incoming messages (such as the "buffer filled" message) would have to be queued for delivery by another thread. This causes a thread switch, which consumes significant processing time.

In addition, the method 200 makes efficient use of threads in that the worker threads are not "blocked" or "spinning" waiting for access to a critical section as occurs when locks and like concurrency isolation mechanisms are used. In the method 200, the worker threads continues unbundling messages from the connection manager's in buffer and placing the messages in the message queue of a clique when the clique is busy. Also, the worker threads continue delivering messages to state machines in a clique as long as there are messages pending to process in the clique.

Further, the use of cliques greatly simplifies the programming of the state machines that execute in this environment. Through the use of cliques in the method 200, the connection manager ensures that no more than one thread executes in a state machine protected by the clique at a time. This liberates the programmer from having to write code for the state machine that implements locks or other conventional concurrency isolation mechanisms inside the state machine to prevent concurrent access to the state machine's private data.

Cliques Structure

Figure 8:
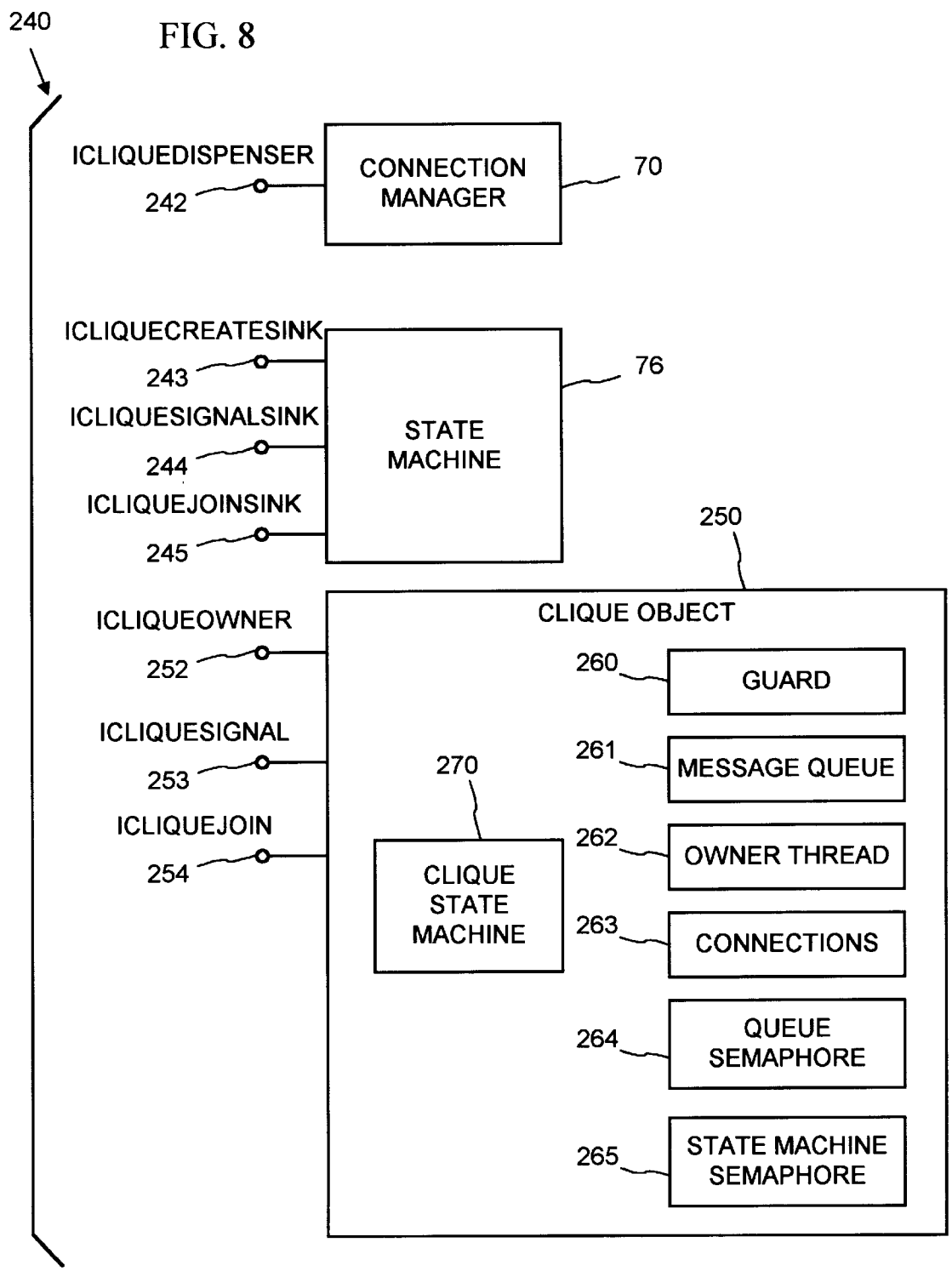
FIG. 8 is a block diagram of objects and interfaces that implement cliques in the software architecture of FIG. 2.

With reference to FIG. 8, a clique in the illustrated embodiment of the invention is implemented using a set of objects and object interfaces 240 that may conform to a well known object standard, such as Microsoft's COM, and apply well known object oriented programming principles. In the illustrated connection manager architecture 74 (FIG. 2), the connection manager 70 provides an ICliqueDispenser interface 242 while each state machine 76 supports an ICliqueCreateSink interface 243, an ICliqueSignalSink interface 244, and an ICliqueJoinSink interface 245 Each clique is implemented as a clique object 250 that supports an ICliqueOwner interface 252, an ICliqueSignal interface 253, and an ICliqueJoin interface 254.

The ICliqueDispenser Interface

The ICliqueDispenser interface 242 of the connection manager 70 includes a set of functions which a state machine can call to have the connection manager create a clique. The ICliqueDispenser interface 242 is defined in the following C programming language code:

```
DECLARE_INTERFACE_(ICliqueDispenser, IUnknown)
{
    //IUnknown interface methods:
    STDMETHODIMP    QueryInterface
        (REFIID iid, LPVOID FAR *ppv) PURE;
    STDMETHODIMP_(ULONG)    AddRef (void) PURE,
    STDMETHODIMP_(ULONG)    Release (void) PURE,
    virtual HRESULT Create
        (/*[in]*/ICliqueCreateSink * pICliqueCreateSink) PURE;
};
```

The ICliqueDispenser::Create function in this interface 242 creates an instance of the clique object. The state machine 76 passes a pointer to its ICliqueCreateSink interface 243 as the pICliqueCreateSink parameter when calling this function. The function returns to the state machine a pointer to the created clique object's ICliqueOwner interface 252 via the state machine's ICliqueCreateSink interface 243.

The ICliqueCreateSink Interface

The ICliqueCreateSink interface 243 of the state machine 76 includes a single function, called ReceiveClique, for receiving the ICliqueOwner interface pointer from the connection manager when creating the clique object. The ICliqueCreateSink interface is defined in the following C programming language code:

```
DECLARE_INTERFACE(ICliqueCreateSink)
{
    virtual void ReceiveClique
        (/*[in]*/ICliqueOwner * pICliqueOwner)PURE;
};
```

The ICliqueOwner Interface

The ICliqueOwner interface 252 of the clique object 250 is defined in the following C programming language code:

```
DECLARE_INTERFACE_(ICliqueOwner, IUnknown)
{
    //IUnknown interface methods:
    STDMETHODIMP    QueryInterface
        (REFIID iid, LPVOID FAR *ppv) PURE,
    STDMETHODIMP_(ULONG) AddRef(void) PURE,
    STDMETHODIMP_(ULONG) Release(void) PURE,
    HRESULT RequestConnection
        (    /*[in]*/INameObject * pINameObject,
            /*[in]*/CONNECTION_REQ_TYPE ConnReqType,
            /*[in]*/DWORD dwConnType,
            /*[out]*/IConnection ** ppIConn) PURE;
    HRESULT RegisterJoinSink
        (/*[in]*/ICliqueJoinSink * pICliqueJoinSink) PURE,
    HRESULT UnregisterJoinSink ( void ) PURE;
    HRESULT SetTimerSink
        (    /*[in]*/BOOLfRecurring,
            /*[in]*/DWORD dwTimeOut,
            /*[in]*/DWORD dwItem,
            /*[in]*/CCliqueTimerSink * pCCliqueTimerSink)
            PURE,
    HRESULT CancelTimerSink
        (/*[in]*/CCliqueTimerSink * pCCliqueTimerSink) PURE,
    HRESULT RegisterSignalSink
        (/*[in]*/ICliqueSignalSink * pICliqueSignalSink) PURE,
    HRESULT UnregisterSignalSink (void) PURE;
};
```

The ICliqueOwner::RequestConnection function in this interface can be called by the state machine to request that a connection be created that is automatically included in the clique.

The ICliqueOwner::JoinSink function allows another clique to register its ICliqueJoinSink interface with the clique object, which allows the clique implemented by the clique object to join the other clique.

The ICliqueOwner::UnRegisterJoinSink function unregisters the ICliqueJoinSink interface from the clique object.

The ICliqueOwner::SetTimerSink and ICliqueOwner::CancelTimerSink functions respectively register and unregister a clique timer sink object (described below) with the clique object.

The ICliqueOwner::RegisterSignalSink and UnregisterSignalSink functions register and unregister, respectively, a signal sink object interface with the clique to allow threads that do not have access to the clique (e.g., while the clique is busy) to send messages into it.

The ICliqueSignalSink Interface

CCliqueSignalSink is a class of object that is instantiated by the state machine, and supports the ICliqueSignalSink interface 244. The state machine registers this interface with the clique using the ICliqueOwner::RegisterSignalSink function so as to be able to receive messages from threads that do not have access to the clique. The clique object calls the Signal function on this interface to deliver a message received by the clique object on its ICliqueSignal interface 253 from the thread. The CCliqueSignalSink class is defined in the following C++ programming language code:

```
class CCliqueSignalSink
{
    void    Signal (void) PURE;
};
```

The ICliqueSignal Interface

The ICliqueSignal interface 253 is an interface on a clique object that exposes a function that can be used by threads that do not own the guard 260 (described below) on the clique to send messages to it. The message is passed in a SIGNAL_FOR_CLIQUE object that is created for the purpose by the state machine originating the message. The interface is defined in the following C programming language code:

```
DECLARE_INTERFACE_(ICliqueSignal, IUnknown)
{
    virtual HRESULT    Signal (/*[in]*/DWORD dwCookie) PURE;
};
```

The ICliqueJoin Interface

The ICliqueJoin interface 254 is provided on the clique object 250 to allow joining and splitting of cliques. The interface 254 is defined in the following C programming language code:

```
DECLARE_INTERFACE_(ICliqueJoin, IUnknown)
{
    //IUnknown interface methods:
    STDMETHODIMP      QueryInterface (REFIID iid, LPVOID FAR
*ppv) PURE,
    STDMETHODIMP_(ULONG)      AddRef (void) PURE;
    STDMETHODIMP_(ULONG)      Release (void) PURE;
    HRESULT Join (  /*[in]*/ICliqueOwner * pICliqueOwnerOfCaller,
                    /*[in]*/DWORD    dwItem,
                    /*[in]*/void * pv,
                    /*[in]*/CJoinStatusSink * pCJoinStatusSink)
                    PURE;
    HRESULT Unjoin (  /*[in]*/ICliqueOwner * pICliqueOwner,
                    /*[in]*/CJoinStatusSink * pCJoinStatusSink
                    )PURE;
};
```

The Join method on this interface 254 is used to join two cliques. A state machine that is to share data between two cliques registers a JoinStatusSink object (described below) with a clique (e.g., clique A) to which other cliques (e.g., clique B) can join. The clique B calls the Join method on the ICliqueJoin interface of clique A which operates to join the cliques, but only if the JoinSink object has been registered with clique A.

A clique that is joined to another clique calls the UnJoin method on the other clique's interface 254 to unjoin the cliques.

CCliqueTimerSink

CCliqueTimerSink is a class of object that is instantiated by a state machine and registered on a clique via the ICliqueOwner::SetTimerSink method to receive a notification from the clique on event of a timeout. The class is defined by the following C++ programming language code:

```
class CCliqueTimerSink
{
public:
    1300L       m_fBool1;
    DWORD       m_dwItem;
    void*       m_pvR1;
    void*       m_pvR2;
    DWORD       m_dwInternal1;
    DWORD       m_dwInternal2;
    DWORD       m_dwInternal3;
public:
    virtual void    TimerTick (/*[in]*/DWORD dwItem) PURE,
};
```

CCliqueJoinStatusSink

CJoinStatusSink is a class of object that is instantiated by the user and passed as a parameter to the ICliqueJoin::Join method call. This object has data members that are used by the connection manager to record the results of a join operation between two cliques. The methods on the object are called by a clique with which the JoinStatus object is registered when another clique calls the clique's ICliqueJoin::Join function to request joining. For example, when the Join method of clique B is called by clique A, clique B calls the JoinAccepted method of its registered JoinStatusSink object (with a void argument) if clique B accepts the join request Clique B call the JoinRejected method when the join request is rejected, and may pass an argument indicating a reason for rejection. If clique B retrieves its JoinStatusSink object by calling ICliqueOwner::UnregisterJoinSink, then the NoCliqueJoinAvailable method is called. The class is defined in the following C++ programming language code:

```
class CJoinStatusSink
{
public:
    ICliqueOwner    *       m_pICliqueOwnerCaller;
    DWORD                   m_dwItem;
    void            *       m_pv;
    void            *       m_pvReserved;
    WORD                    m_wReserved;
public:
    virtual void    JoinAccepted (/*[in]*/void * pv) PURE;
    virtual void    JoinRejected (/*[in]*/DWORD dwReason) PURE;
    virtual void    NoCliqueJoinAvailable ( void ) PURE;
    virtual void    Unjoined (void) PURE;
};
```

The ICliqueJoinSink

The ICliqueJoinSink interface 245 also is supported on an object instantiated by a state machine and registered on a clique via the ICliqueOwner::RegisterJoinSink function. By registering an instance of this sink, the clique can provide to the state machine an indication of a reason for refusing a join request from another clique. The ICliqueJoinSink interface 245 is defined by the following C programming language code:

```
DECLARE_INTERFACE(ICliqueJoinSink)
{
    virtual HRESULT Join (  /*[in]*/DWORD dwItem,
                            /*[in]*/ void * pvIn,
                            /*[in-out]*/ DWORD * pdwReason,
                            /*[out]*/ void ** ppvOut) PURE;
};
```

Clique Object Data members

With reference still to FIG. 8, the illustrated clique object 250 includes the following data structures: a guard 260, a message queue 261, an owner thread 262, a set of connections 263, a queue semaphore 264, a state machine semaphore 265. The clique object includes a block of code that operates as a state machine 270 having the four states 272–275 shown in FIG. 9.

The guard 260 is a data value that marks whether the clique is busy or not busy. The guard is set by a thread when entering the clique to mark the clique as busy and prevent entry into the clique by another thread while executing within the clique as described above according to the method 200 of FIG. 7.

The message queue 261 is a queue data structure for holding messages that arrive while the clique is busy, and from which the messages are picked up for delivery by the thread that is executing within the busy clique upon completing processing of the current message as also described above according to the method 200 of FIG. 7.

The owner thread 262 is a data structure that contains a reference to a thread that is currently executing in the clique.

The set of connections 263 is a data structure that contains references to the connections objects which implement connections contained in the clique.

The queue semaphore 264 and state machine semaphore 265 are semaphores that operates to protect critical sections and data structures in the clique object, specifically the clique state machine 270 and message queue 261.

Figure 9:
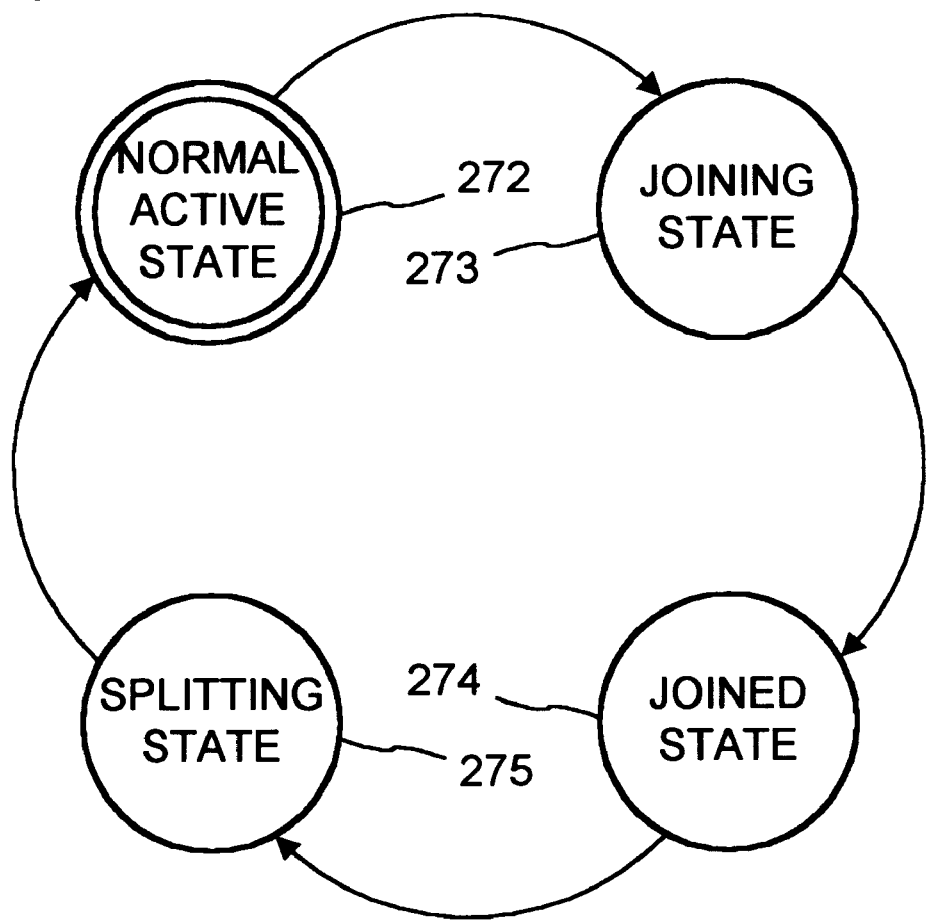
FIG. 9 is a state diagram showing state transitions that occur in the operation of a clique object in FIG. 8.

The clique state machine 270 is a block of code in the clique object that operates as a state machine having four states, a normal active state 272, a joining state 273, a joined state 274, and a splitting state 275 depicted in FIG. 9. The clique state machine provides the functionality in the clique object for the clique to join with another clique as described above with reference to the tree of cliques in FIG. 6.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system, a method of controlling concurrency of a set of threads executing in a plurality of state machines, the method comprising the steps of:

forming connections for exchanging messages between pairs of the state machines;

using the threads to deliver messages arriving on the connections to state machines and process the messages in the state machines;

for a set of the state machines having a common relationship, grouping connections from the set to state machines outside the set into a clique;

providing a guard value associated with the clique for tracking whether any thread is currently executing in the set;

while a first thread is delivering a first incoming message arriving on a first connection in the clique to a first state machine in the set, setting the guard value to indicate a thread is executing in the set and preventing any other thread from delivering another message arriving on any connection in the clique to any state machine in the set, whereby only a single thread executes in the set at a time.

2. The method of claim 1 further comprising the step of queueing any messages that arrive on any connections in the clique to any state machines in the set while the guard value indicates a thread is executing in the set for later delivery to said any state machines.

3. The method of claim 2 further comprising the step of: on completion of delivering and processing the first incoming message by the first thread, using the first thread to deliver and process said any messages.

4. The method of claim 3 further comprising the step of: upon the first thread completing delivery and processing of all messages currently pending delivery on any connection in the clique, resetting the guard value to indicate no thread is executing in the set.

5. The method of claim 1 further comprising the step of: on arrival of a second incoming message on any connection in the clique while the guard value indicates a thread is executing in the set, queueing the second incoming message for later delivery.

6. The method of claim 5 further comprising the step of: on completion of delivering and processing the first incoming message by the first thread, using the first thread to deliver the second incoming message.

7. A method of managing concurrency in a computer operating environment comprising a plurality of state machines and connections between the state machines, the method comprising the steps of:

organizing connections to a set of the state machines into a clique;

delivering messages to the state machines in the clique with one of a plurality of worker threads, wherein
      when a thread is to deliver a message to a state machine in the clique, checking whether the clique is busy;
      if the clique is marked as busy queueing the message;
      if the clique is not busy, performing the steps of:
         marking the clique as busy;
         delivering the message to the state machine by the worker thread;
         processing the message in the state machine by the worker thread;
         delivering and processing any other messages queued for the state machines in the clique by the worker thread; and
         exiting processing in the state machines of the clique and marking the clique as not busy by the worker thread.

8. The method of claim 7 further comprising the steps of:

organizing connections to each of first and second sets of state machines into first and second cliques, respectively;

at a time when the first and second sets of state machines have a common relationship, joining the first and second cliques to form a joined clique; and managing delivery of messages to the state machines in the joined clique with the worker threads to ensure that at most one of the worker threads executes concurrently in the state machines in the joined clique.

9. The method of claim 8 further comprising the steps of:

at a time when the first and second sets of state machines no longer have the common relationship, splitting joined clique into the first and second cliques; and managing delivery of messages to the state machines in the first and second cliques with the worker threads to ensure that at most one of the worker threads executes concurrently in the state machines in the first clique and at most one of the worker threads executes concurrently in the second clique.

10. A computer readable medium having computer executable instructions stored thereon for performing the method of claim 7.

11. A connection manager in a computer system for providing concurrency isolation in state machines, comprising:

code for providing connections for passing messages between state machines;

code for grouping connections of a set of the state machines into a clique, the clique having a message queue and a guard value for marking the clique as busy or not busy;

code for delivering messages arriving on any connections in the clique to the state machines using a group of worker threads, the code operating in response to the guard value to:

when the guard value marks the clique as busy, queue the arriving messages in the clique's message queue; and when the guard value marks the clique as not busy, mark the clique as busy and use one of the worker threads to deliver a first arriving message to a state machine;

whereby the connection manager ensures that no more than one thread executes concurrently in the set of state machines.

12. The connection manager of claim 11 comprising:

code for, on completing delivery of the first arriving message by said one worker thread, using said one worker thread to also deliver any messages that are queued in the clique's message queue during delivery of the first arriving message.

13. A computer operating environment for providing concurrency control to a block of code, comprising:

a thread pool having a plurality of threads;

a message delivery medium for carrying messages to and from the block of code; and a message gate for serializing delivery of messages arriving on the message delivery medium to the block of code using the threads such that at most a single thread executes in the block of code at any time.

14. The computer operating environment of claim 13 comprising:

a message queue for buffering messages that arrive on the message delivery medium during delivery of a preceding message to the block of code using one of the threads.

15. The computer operating environment of claim 14 wherein the message gate, upon completing delivery of a first message using a thread to the block of code, reuses the thread to also deliver messages to the block of code that have been buffered in the message queue during delivery of the first message.

16. In a computer system, a method of efficiently managing a plurality of threads to perform individual units of work in a block of code, comprising the steps of:

receiving requests to perform the individual units of work from client code blocks;

dispatching any of the plurality of threads to perform the requested individual units of work by executing in the block of code; and on a conflict between threads for concurrent execution in the block of code, queueing any later units of work pending completion of a first unit of work being performed by a first of the threads that is currently executing in the block of code.

17. The method of claim 16 further comprising the step of:

upon the first thread completing the first unit of work, executing by the first thread in the block of code to also perform the any queued units of work.

18. In a computer system, a method of efficiently managing a set of threads executing in a plurality of state machines, the method comprising the steps of:

forming connections for exchanging messages between pairs of the state machines;

using the threads to deliver messages arriving on the connections to state machines and process the messages in the state machines;

for a set of the state machines having a common relationship, grouping connections from the set to state machines outside the set into a clique;

providing a guard value associated with the clique for tracking whether any thread is currently executing in the set;

queueing any messages that arrive on any connections in the clique to any state machines in the set while the guard value indicates a thread is executing in the set for later delivery to said any state machines; and on completion of delivering and processing any message in the set by a first thread, using the first thread to also deliver and process said queued messages.

* * * * *

UNITED STATES PATENT AND TRADEMARK OFFICE
CERTIFICATE OF CORRECTION

PATENT NO. : 6,167,423
DATED : December 26, 2000
INVENTOR(S) : Gagan Chopra et al.

It is certified that error appears in the above-identified patent and that said Letters Patent is hereby corrected as shown below:

Title page
Page 2, Other Publications,
"Controllong" should read -- Controlling --
"Amultiprocessor" should read -- A Multiprocessor --
"Multiprocessor" should read -- Multiprocessors --
"iii-vii" should read -- iii-vi --
"toDijkstra's" should read -- to Dijkstra's --

ABSTRACT,
"busy," should read -- busy --.

Column 2,
Line 29, "section The" should read -- section. The --
Line 37, "satisfied Another" should read -- satisfied. Another --

Column 3,
Line 5, "invention." should read -- invention, --
Line 23, "time By" should read -- time. By --
Line 36, "data" should read -- data. --

Column 5,
Line 41, "few," should read -- few. --
Line 59, "20" should read -- 20. --

Column 6,
Line 31, "5;" should read -- 51 --
Line 43, "used" should read -- used. --

Column 8,
Line 22, "held" should read -- held. --
Line 23, "received" should read -- received, --
Line 38, "network'" should read -- network. --

Column 10,
Line 30, "completes This" should read -- completes. This --

Column 11,
Line 26, "70 At" should read 70. At --
Lines 47 and 48, "211 As" should read -- 211. As --

UNITED STATES PATENT AND TRADEMARK OFFICE
CERTIFICATE OF CORRECTION

PATENT NO.   : 6,167,423
DATED        : December 26, 2000
INVENTOR(S)  : Gagan Chopra et al.

It is certified that error appears in the above-identified patent and that said Letters Patent is hereby corrected as shown below:

Column 12,
Line 52, "continues" should read -- continue --

Column 13,
Lines 28, 29 and 64, "PURE," should read -- PURE; --
Line 53, "plcliqueowner" should read -- pIcliqueowner --

Column 14,
Line 18, "PURE," should read -- PURE; --

Column 15,
Lines 19 and 59, "PURE," should read -- PURE; --
Line 52, "1300L" should read -- BOOL --

Column 17,
Line 5, "operates" should read -- operate --
Line 59, "of" should read -- of: --

Column 20,
Line 6, "blocks" should read -- blocks sent as messages via a group of connections providing full-duplex, exactly once, in-order delivery of messages between the client code blocks and the block of code; --
on receiving said requests via the group connections, --
Line 11, "code" should read -- code to perform the requested individual units of work serially --

UNITED STATES PATENT AND TRADEMARK OFFICE
CERTIFICATE OF CORRECTION

PATENT NO. : 6,167,423
DATED : December 26, 2000
INVENTOR(S) : Gagan Chopra et al.

It is certified that error appears in the above-identified patent and that said Letters Patent is hereby corrected as shown below:

Line 11, "work pending " should read -- work later received on the group of connections in a queue related the group of connection pending --
Line 11, "any later units" should read -- any units --

Signed and Sealed this

Fourth Day of December, 2001

Attest:

*Attesting Officer*

NICHOLAS P. GODICI
*Acting Director of the United States Patent and Trademark Office*